United States Patent [19]

Pennington, Jr. et al.

[11] Patent Number: 5,712,429

[45] Date of Patent: Jan. 27, 1998

[54] PRESSURE-RESPONSIVE INSTRUMENT WITH FILTER

[76] Inventors: R. Randolph Pennington, Jr., P.O. Box 266724, Houston, Tex. 77207-6724; Eugene R. Johnson, P.O. Box 2242, Pearland, Tex. 77588

[21] Appl. No.: 620,972

[22] Filed: Mar. 25, 1996

[51] Int. Cl.$^6$ .................................................. G01L 7/04
[52] U.S. Cl. ............................................. 73/732; 73/741
[58] Field of Search ................................. 73/732–743

[56] References Cited

U.S. PATENT DOCUMENTS 4,059,018  11/1977  Reick ........................................ 73/732
4,838,090  6/1989  Hestich ................................ 73/741 X Primary Examiner—Richard Chilcot
Assistant Examiner—Joseph L. Felber
Attorney, Agent, or Firm—Harrison & Egbert

[57] ABSTRACT

A pressure instrument for connection to a process line including a gland having an interior passageway, a body connected to the gland and having a fluid line extending therethrough in fluid communication with the interior passageway of the gland, a pressure-responsive instrument connected to said fluid line, and a filter disposed in the interior passageway of the gland so as to prevent particles from passing from the instrument to the process line. The body has a pilot formed at one end of the body so as to be received within an end of the gland. The body is welded to the gland rearwardly of the pilot. The filter is positioned within the interior passageway of the gland forward of the pilot of the body. The pressure-responsive instrument is a bourdon tube having an interior in fluid communication with the fluid line.

16 Claims, 1 Drawing Sheet

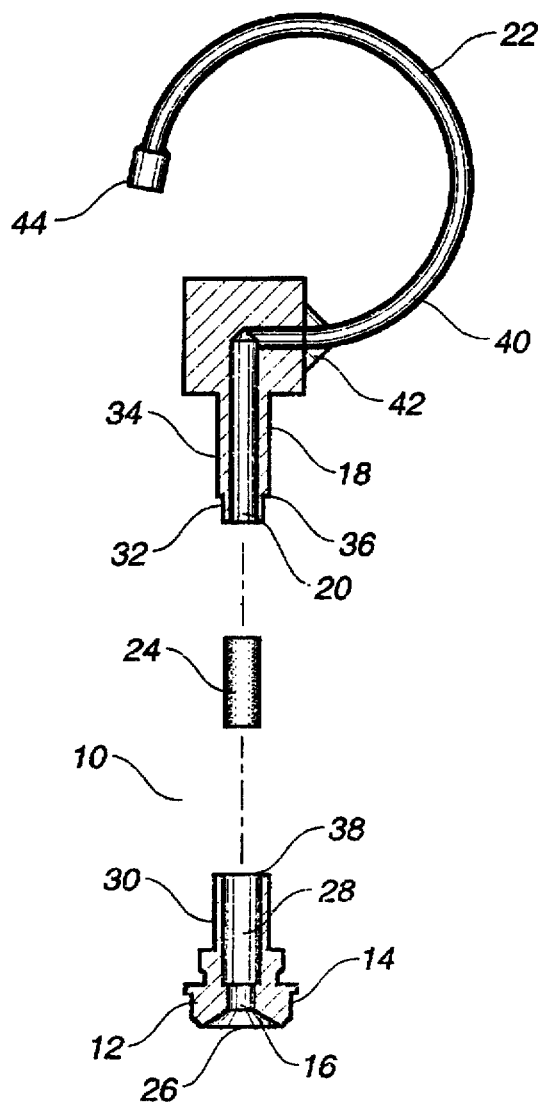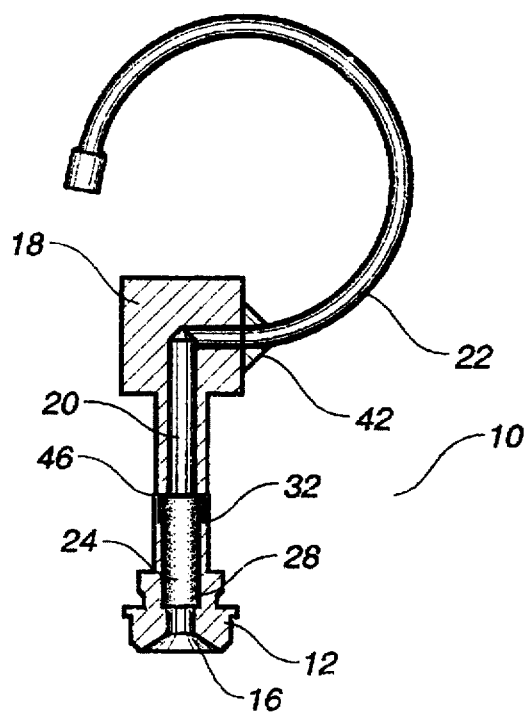
FIG. 1
FIG. 2

PRESSURE-RESPONSIVE INSTRUMENT WITH FILTER

TECHNICAL FIELD

The present invention relates generally to pressure-responsive instruments. More particularly, the present invention relates to pressure gauges employing a bourdon tube for detecting pressure changes in a process line. More particularly, the present invention relates to filters used in conjunction with process line instruments.

BACKGROUND ART

In many process industries, it is extremely important to prevent contaminating particles from entering the process line. Typically, throughout the process line, filters are installed so as to prevent particles from contaminating the process. However, it often becomes virtually impossible, with most industrial filters, to prevent sub-micron particles from contaminating the fluid process. This is an extremely important problem and one that is very difficult to deal with in certain industries. The most important of these industries is in the manufacturing of silicon-based integrated circuits for the electronics industry.

It has been found that the manufacture of instruments and gauges can be the source of the contamination for the process. Very small particles are commonly shed from the bourdon tube and the welded area of a pressure gauge. Once these sub-micron particles enter the fluid process, they will contaminate the system.

The current procedure for controlling contamination is to manufacture everything to a very highly polished finish of by electro-polishing. Unfortunately, it is not possible to electro-polish an instrument that does not have a flow-through design. This fact has left many instruments, commmonly known as dead-end devices, relegated to less critical applications within the ultra-high purity (UHP) market. These dead-end devices often have to be placed in such a manner that an expensive in-line UHP filter is downstream of their location. These dead-end devices are typically pressure-responsive instruments, such as pressure gauges, pressure switches, and certain types of pressure transducers.

In many pressure-responsive instruments, a hourdon tube is employed. The hourdon tube is a flexible tube that will deflect in response to pressure entering the tube. The deflection of the bourdon tube can be registered as an indication of pressure or pressure change by an appropriately attached pressure gauge. Unfortunately, since the hourdon tube is a curved deflectable dead-end tube, it is not possible to electro-polish the interior of such a bourdon tube. As a result, whenever a bourdon tube is employed in a pressure gauge in an ultra-high purity system, the interior of the bourdon tube is likely to shed very small particles during the process of deflecting. As such, it is important to prevent any of such particles from entering the process line.

It is an object of the present invention to provide a pressure-responsive instrument that prevents sub-micron particles from entering the process line.

It is another object of the present invention to provide a pressure-responsive instrument which will prevent welding debris and particles of the welding process from entering the process line.

It is another object of the present invention to provide a pressure-responsive instrument which functions as a snubber so as to balance pressures within the pressure instrument.

It is another object of the present invention to provide a pressure-responsive instrument which will dampen the instantaneous reaction of a bourdon tube to pressure changes.

These and other objects and advantages of the present invention will become apparent from a reading of the attached specification and appended claims.

SUMMARY OF THE INVENTION

The present invention is a device for connection to a process line comprising a gland having a means for attachment to the process line and having an interior passageway extending therethrough, a dead-end instrument in fluid communication with the interior passageway of the gland, and a filter affixed within the interior passageway of the gland. The filter serves to prevent particles from the dead-end instrument from passing through to the process line.

In the present invention, the dead-end instrument comprises a body connected to the gland and having a fluid line formed therein, and a bourdon tube connected to the body and having an interior chamber in fluid communication with the fluid line. The body has a pilot formed on an end of the body opposite the bourdon tube. This pilot is received by the interior passageway of the gland. The filter is positioned below the pilot in the interior passageway. The gland is welded to the body at a location above the filter. Specifically, the gland is welded to the body at a rearward part of the pilot.

The gland has an internal chamber formed in the interior passageway. The filter is received within this internal chamber. The internal chamber has a greater diameter than the fluid line of the body. The filter is disposed in the internal chamber adjacent to the fluid line. The internal chamber opens at the end of the gland opposite the means for attachment to the process line.

The filter serves to filter particles having a diameter of less than one-half micron.

BRIEF DESCRIPTION OF THE DRAWINGS

FIG. 1 is an exploded side cross-sectional view of the pressure-responsive instrument in accordance with the preferred embodiment of the present invention.

FIG. 2 is a cross-sectional side view of the pressure-responsive instrument of the present invention.

DETAILED DESCRIPTION OF THE INVENTION

Referring to FIG. 1, there is shown at 10 the pressure instrument in accordance with the teachings of the present invention. The pressure instrument 10 includes a gland 12 having a means 14 for attachment to a process line. The gland 12 includes an interior passageway 16. A body 18 is connected to the gland 12. The body 18 has a fluid line 20 extending therethrough. When the instrument is assembled (in the manner shown in FIG. 2), the fluid line 20 will be in fluid communication with the interior passageway 16 of the gland 12. A pressure-responsive instrument 22 is connected to the fluid line 20 of the body 18 so as to be in fluid communication therewith. A filter 24 is disposed in the interior passageway of the gland 12 so as to prevent particles from passing from the pressure-responsive instrument 22 into the process line.

With reference to FIG. 1, it can be seen that the gland 12 has an opening 26 which will be in communication with the fluid in a process line. The gland 12 includes appropriate connections whereby the gland 12 can be installed, in a conventional manner, into an appropriate port on a pressure line. The internal passageway 16 extends from the opening 26 through the gland 12. An internal chamber 28 is formed on the interior of the gland 12 for the receipt of the filter 24.

The internal chamber 28 has a greater diameter than the remaining portion of the interior passageway 16. The internal chamber 28 is formed within a tubular nose 30 of the gland 12. As shown in FIG. 1, the gland 12 will resemble conventional pressure instrument glands, except for the formation of the internal chamber 28 for the purpose of receiving the filter 24. The filter 24 is a sub-micron filter. As such, filter 24 is capable of preventing the passage of particles having a diameter of less than one-half micron therethrough. The filter 24 can be a sintered, TEFLON (™) or ceramic filter.

The body 18 has a pilot 32 formed at one end. The pilot 32 is a tubular portion of lesser diameter than a remaining portion 34 of the body 18. The fluid line 20 extends through the pilot 32 and the remaining portion 34 of the body 18. The fluid line 20 opens at the bottom end of the pilot 32. The pilot 32 has an outer diameter generally matching the interior diameter of the internal chamber 28 of the gland 12. A shoulder 36 is formed at the rearward part of the pilot 32 for abutment with the top surface 38 of the gland 12. As will be described hereinafter, the shoulder 36 will be welded to the top 38 of the gland 12. The filter 24 will be positioned so as to prevent any particles from the welding process from passing therethrough and into the process line.

The pressure-responsive instrument 22 is a bourdon tube. The bourdon tube has an interior 40 in fluid communication with the fluid line 20 of the body 18. It can be seen that one end of the bourdon tube 22 is welded at 42 to the body 18. In normal use, the bourdon tube 22 will deflect relative to the pressure of fluid therein. The greater the pressure of fluid on the interior of the bourdon tube 22, the greater the bourdon tube 22 will deflect. The opposite end 44 of the bourdon tube 22 is closed such that the bourdon tube 22 is a dead-end instrument. As can be seen, it would be virtually impossible to electro-polish the interior of the bourdon tube 22.

FIG. 2 shows the assembled configuration of the instrument 10 Of the present invention. Importantly, it can be seen that the filter 24 is disposed within the internal chamber 28 of the gland 12. The filter 24 is positioned below the end of the pilot of the body 18. The filter 24 is a greater diameter than that of the fluid line 20 of the body 18. The bourdon tube 22 remains in fluid communication with the fluid line 20.

It can be seen that the pilot 32 has been inserted into the internal chamber 28 of the gland 12. As a result, the top end 38 of the gland 12 will reside in close proximity to the shoulder 36 of the body 18. When the instrument 10 is in its assembled condition, as shown in FIG. 2, a weld 46 is used to connect the gland 12 to the body 18.

Importantly, it can be seen that the filter 24 is positioned below the weld 46 and also below the weld 42 of the instrument 10. As such, any weld particles that would enter the fluid line 20 would be prevented, by the filter 24, from passing through the interior passageway 16. The filter 24 will block the passage of such particles. Additionally, if any particles should be shed from the interior surfaces of the bourdon tube 22, then the filter 24 will be particularly effective in preventing such particles from entering the process line through the interior passageway 16. As a result, the present invention provides a filtering mechanism for preventing sub-micron particles lodged in the gauge at the time of manufacture from leaving the gauge and contaminating an ultra-high purity system. The incorporation of the filter into the instrument 10 of the present invention is a much more economical system than prior attempts at placing such filters downstream of the process line. Ultimately, the incorporation of the filter 24 into the instrument 10 is a much less expensive approach than prior attempts to prevent particles from entering the process from the gauges and instruments.

In addition to preventing particles from entering the process line from the instrument, the incorporation of the filter 24 also provides other benefits to the operation of the instrument 10. The use of the sub-micron filter 24 serves to slow the process fluid from entering the hourdon tube 22. As such, the filter 24 will act as a "snubber" for the purpose of restricting the bore for reducing flow characteristics. As a result, it will serve to balance the pressures more slowly on both sides of the filter 24 so that the gauge will read more accurately. The filter 24 will serve to dampen the instantaneous deflections of the hourdon tube 22 in response to pressure changes in the process line. As a result, radical fluctuations and deflections of the bourdon tube 22 are effectively prevented.

The use of the filter on the instrument 10 of the present invention allows the ultra-high purity systems to use the pressure gauges in critical portions of the system. Since contamination of the fluid in the process line is effectively prevented by the use of the filter 24, it is now possible to use the dead-end devices in such process industries. Additionally, the present invention eliminates the need for installing a UHP filter downstream of the location of dead-end device. The present invention not only prevents the release of particles from the gauges from entering the process line, but also prevents the passage of small welding particles from entering the process line.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

We claim:

1. A device for connection to a process line comprising:

a gland having a means for attachment to the process line, said gland having an interior passageway;

a dead-end instrument in fluid communication with said interior passageway of said gland, said dead-end instrument being responsive to fluid pressure changes, and said dead end instrument comprising:

a body connected to the said gland, said body having a fluid line formed therein; and a bourdon tube connected to said body, said bourdon tube having an interior chamber in fluid communication with said fluid line, p1 a filter means affixed within said interior passageway, said filter means for preventing particles from said dead-end instrument from passing into the process line, said gland having an internal chamber formed in said interior passageway, said internal chamber having a greater diameter than said fluid line of said body, and said filter means being disposed in said internal chamber adjacent said fluid line.

2. The device of claim 1, said body having a pilot formed on an end of said body opposite said bourdon tube, said pilot received by said interior passageway of said gland.

3. The device of claim 2, said filter means being positioned below said pilot in said interior passageway.

4. The device of claim 2, said gland being welded to said body at a rearward part of said pilot opposite said filter means.

5. The device of claim 1, said gland being welded to said body at a location above said filter means.

6. The device of claim 1, said gland having a first end having said means for attachment thereon and a second end opposite said first end, said internal chamber opening at said second end.

7. The device of claim 6, said body having a pilot formed at one end thereof, said pilot being slidably received within said second end of said gland.

8. The device of claim 7, said body having a shoulder formed at said pilot, said shoulder being welded to said second end of said gland.

9. The device of claim 1, said filter means for filtering particles having a diameter of less than one-half micron.

10. A pressure instrument for connection to a process line comprising:

a gland having a means for attachment to the process line, said gland having an interior passageway;

a body connected to said gland, said body having a fluid line extending therethrough, said fluid line being in fluid communication with said interior passageway;

a pressure-responsive instrument connected to said fluid line; and a filter means disposed in at least one of said fluid line and said interior passageway, said filter means for preventing particles from passing to the process line, at least one of said interior passageway and said fluid line having an internal chamber formed therein of greater diameter than the other of said interior passageway and said fluid line, said filter means being received within said internal chamber.

11. The instrument of claim 10, said body having a pilot formed at one end of said body, said pilot received within an end of said gland, said body being welded to said gland rearwardly of said pilot.

12. The instrument of claim 11, said filter means being positioned within said interior passageway forward of said pilot.

13. The instrument of claim 10, said internal chamber formed in said interior passageway of said gland, said gland having a first end having said means for attachment and a second end opposite said first end, said internal chamber opening at said second end.

14. The instrument of claim 10, said pressure-responsive instrument being a bourdon tube, said bourdon tube having an interior in fluid communication with said fluid line.

15. The instrument of claim 14, said bourdon tube being welded to said body, said filter means interposed between said bourdon tube and said means for connection of said gland to the process line.

16. The instrument of claim 10, said filter means for filtering particles having a diameter of less than one-half micron.

* * * * *